United States Patent [19]

Castle

[11] 4,202,742

[45] May 13, 1980

[54] PHOTOPOLYMERIZATION OF ETHYLENICALLY UNSATURATED MONOMERS

[75] Inventor: Peter M. Castle, Penn Hills, Pa.

[73] Assignee: Westinghouse Electric Corp., Pittsburgh, Pa.

[21] Appl. No.: 34,311

[22] Filed: Apr. 30, 1979

[51] Int. Cl.$^2$ .............................. C08F 2/46; C08F 4/00
[52] U.S. Cl. .......................... 204/159.23; 204/159.15; 204/159.18; 204/159.22; 204/159.24; 430/908; 430/918; 430/285
[58] Field of Search ...................... 204/159.18, 159.23, 204/159.24, 159.22; 96/115 P

[56] References Cited

U.S. PATENT DOCUMENTS 3,405,045  10/1968  Hoskins .......................... 204/159.11

OTHER PUBLICATIONS

Wilson et al., Journal of the American Chemical Society, vol. 96, pp. 7350–7351, Nov., 1974.

Primary Examiner—Richard B. Turer
Attorney, Agent, or Firm—R. D. Fuerle

[57] ABSTRACT

An initiator-free composition is prepared of an ethylenically unsaturated monomer and the inhibitor parabenzoquinone or hydroquinone. The composition is irradiated with light having a wavelength within the absorption spectrum of the inhibitor, other than ultraviolet. The light causes the inhibitor to produce a reactive species which initiates polymerization.

10 Claims, No Drawings

PHOTOPOLYMERIZATION OF ETHYLENICALLY UNSATURATED MONOMERS

BACKGROUND OF THE INVENTION

Parabenzoquinone and hydroquinone are commonly used polymerization inhibitors. These compounds act as free-radical scavengers, mopping up any free radicals formed in the monomer solution before they initiate polymerization. The two compounds are in equilibrium in a protic solvent:

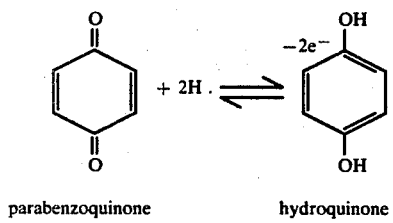

parabenzoquinone   hydroquinone

Parabenzoquinone is known to react with an aliphatic double bond and oxygen on exposure to the 488 μm output line of a one-watt continuous wave argon ion laser (see article by I. R. M. Wilson and S. M. Wunderly in the Journal of the American Chemical Society, 1974, 96, 7350):

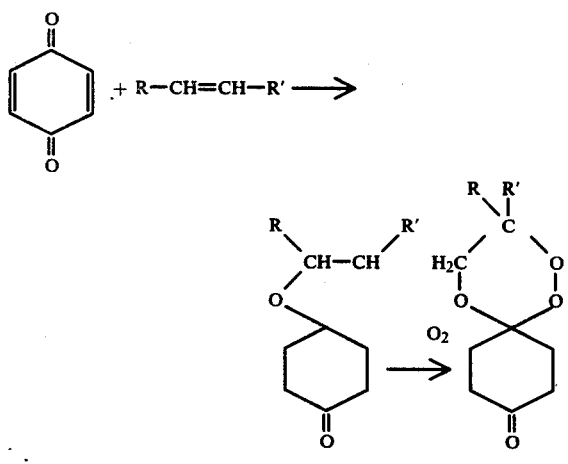

SUMMARY OF THE INVENTION

I have discovered that two compounds, parabenzoquinone and hydroquinone, which are used to inhibit polymerization, will actually initiate polymerization when activated by non-ultraviolet light. Thus, I am able to polymerize a composition which contains only a monomer and an inhibitor and no initiator, solely by irradiation with light.

Because no initiator is present and because I use larger amounts of inhibitor, the monomer compositions of this invention are very stable and can be stored for long periods without gelling.

Also, surprisingly, the polymerization proceeds at much greater depths than are usually realizable with photopolymerization. Depths of more than three-fourths of an inch can easily be achieved.

DESCRIPTION OF THE INVENTION

A composition is first prepared of an ethylenically unsaturated monomer and an inhibitor. The composition must not contain any initiators (e.g., peroxides) as they reduce its stability and are unnecessary. Preferably, no solvents are present either as they are usually unnecessary and their evaporation uses energy and creates pollution problems, but a solvent may occasionally be necessary if an ingredient is not soluble in the monomer.

The monomer must be ethylenically unsaturated (or its equivalent). Acrylates, especially polyfunctional acrylates (e.g., di- and tri-acrylates), are preferred as their reactivity is greater than the other monomers tested. The polyfunctional acrylates which have been found to work very well are hexanedioldiacrylate, trimethylolpropanetriacrylate, tetraethyleneglycoldiacrylate. Other acrylates, which are less reactive, include methylmethacrylate, 2-ethylhexylacrylate, 2-hexylethylacrylate. Other ethylenically unsaturated monomers include styrene, acrylonitrile, acrylamide, ethylene, vinyl chloride, vinyl acetate, vinyl ethers, substituted acrylates, substituted styrenes.

The monomer may be a solid, but liquids are preferred as they have been found to work well.

The amount of inhibitor in the monomer appears to be highly critical because the range in which the reaction proceeds is so narrow. Below about 0.1 mole % no reaction is detectable and above 2.0 mole % the reaction rate slows down. A preferred range is about 1.0 to about 2.0 mole %. The only inhibitors which are used in this invention are parabenzoquinone and hydroquinone. If no oligimer is present, parabenzoquinone seems to work better than hydroquinone, but if an oligomer is present, hydroquinone works better.

An oligomer is preferably not present as the reaction proceeds well without one, but up to 60 mole % of an oligomer may be used if desired. If an oligomer is used, it must be miscible and reactive with the monomer, although it need not be an oligomer of the monomer.

The composition is prepared by simply mixing together its various components, it may then be stored until needed. It can be applied directly as a coating or it can be used to impregnate fabric or other material.

The monomer is cured by exposure to light within the absorption spectrum of the inhibitor, except that ultraviolet light is not used as it does not seem to effect the reaction. Blue visible light works well and wavelengths between about 480 and about 515 microns are preferred. Lasers are preferred as they are the only source of intense light in this wavelength range. Usually at least one watt per square inch is necessary to cure the monomer. The monomer is exposed to the light for as long as necessary to cure it, but typically it will cure with about 3 minutes exposure. No heat is necessary to cure the monomer. The light attacks the inhibitor and the inhibitor then initiates the polymerization.

The cured monomer is a highly cross-linked polymer which can be used as insulation or for other purposes.

The following example further illustrates this invention.

A composition of 5 gms. CHCl$_3$, 4.98 gms. hexanedioldiacrylate, and 0.02 gms. parabenzoquinone was exposed to a laser at an intensity of 0.78 W/cm$^2$ at a wavelength of 488.0 μm for about 60 seconds. About 3 gms. of polymer resulted.

A composition of 5 gms. CHCl$_3$, 4.98 gms. trimethylolpropanetriacrylate, and 0.02 gms. parabenzoquinone was exposed to a laser at an intensity of 0.78

W/cm² at a wavelength of 488.0 μm for about 60 seconds. About 3 gms. of polymer were produced.

These polymers have been characterized and shown to be consistent with acrylate polymers formed by other means. They are reasonably good adhesives when cured in thin films.

I claim:

1. A method of photopolymerizing an ethylenically unsaturated monomer comprising
   (1) preparing a composition of an ethylenically unsaturated monomer and at least about 0.1 mole percent of an inhibitor selected from the group consisting of parabenzoquinone, hydroquinone, and mixtures thereof, said composition being free of any photoinitiator; and
   (2) irradiating said composition with light having a wavelength within the absorption band of said inhibitor, said wavelength being outside of the ultraviolet band.

2. A method according to claim 1 wherein said monomer is a polyfunctional acrylate.

3. A method according to claim 2 wherein said polyfunctinal acrylate is selected from the group consisting of hexanedioldiacrylate, trimethylolpropanetriacrylate, and tetraethyleneglycoldiacrylate.

4. A method according to claim 1 wherein said inhibitor is parabenzoquinone.

5. A method according to claim 1 wherein said wavelength is between about 480 and about 515 μm.

6. A method according to claim 1 wherein said composition is solventless.

7. A method according to claim 1 wherein said monomer is a liquid.

8. A method according to claim 1 wherein the amount of said inhibitor is about 0.1 to about 2.0 mole percent.

9. A method according to claim 8 wherein the amount of said inhibitor is about 1.0 to about 2.0 mole percent.

10. A polymer made according to the method of claim 1.

* * * * *